(12) United States Patent
Garthwaite

(10) Patent No.: US 7,954,100 B1
(45) Date of Patent: May 31, 2011

(54) TAGGED REFERENCES FOR THREAD-LOCAL DATA

(75) Inventor: Alexander T. Garthwaite, Beverly, MA (US)

(73) Assignee: Oracle America, Inc., Redwood City, CA (US)

(*) Notice: Subject to any disclaimer, the term of this patent is extended or adjusted under 35 U.S.C. 154(b) by 1132 days.

(21) Appl. No.: 11/147,067

(22) Filed: Jun. 2, 2005

(51) Int. Cl.
*G06F 9/46* (2006.01)
*G06F 12/02* (2006.01)
*G06F 13/00* (2006.01)
*G06F 17/30* (2006.01)

(52) U.S. Cl. ............ 718/100; 711/1; 711/170; 711/173; 707/813

(58) Field of Classification Search .................. 718/100; 711/1, 173; 717/114
See application file for complete search history.

(56) References Cited

U.S. PATENT DOCUMENTS

| | | | |
|---|---|---|---|
| 5,628,016 A * | 5/1997 | Kukol | 717/140 |
| 6,226,653 B1 * | 5/2001 | Alpern et al. | 1/1 |
| 6,351,749 B1 | 2/2002 | Brown et al. | |
| 6,418,422 B1 | 7/2002 | Guenther et al. | |
| 6,457,023 B1 * | 9/2002 | Pinter et al. | 707/206 |
| 6,757,891 B1 * | 6/2004 | Azagury et al. | 717/158 |
| 6,817,009 B2 | 11/2004 | Flanagan et al. | |
| 6,820,261 B1 | 11/2004 | Bloch | |
| 6,829,686 B2 * | 12/2004 | Mathiske et al. | 711/159 |
| 6,904,589 B1 * | 6/2005 | Kolodner et al. | 717/116 |
| 7,111,294 B2 * | 9/2006 | Steensgaard | 718/100 |
| 2002/0120428 A1 | 8/2002 | Christiaens | |
| 2004/0158589 A1 | 8/2004 | Liang et al. | |

OTHER PUBLICATIONS

Domani, et al., "Thread-Local Heaps for Java," ACM 2002, pp. 76-87.
Domani, et al., "Thread-Local Heaps for Java," IBM Haifa Research Laboratory Mount Carmel, May 17, 2005, 22 pages.

* cited by examiner

*Primary Examiner* — H. S. Sough
*Assistant Examiner* — Phuong N. Hoang
(74) *Attorney, Agent, or Firm* — Robert C. Kowert; Meyertons, Hood, Kivlin, Kowert & Goetzel, P.C.

(57) ABSTRACT

Method and apparatus for tagged references for identifying thread-local data in multithreaded applications. Embodiments may provide a dynamic mechanism that identifies thread-local objects by "tagging" references to the objects. In embodiments, in an application, if an object is to be allocated as a thread-local object, one or more bits of the object reference may be "tagged" to indicate that the object is a thread-local object. In one embodiment, the lowest-order bit of the object reference may be set to indicate that the object is a thread-local object. In embodiments, thread locality of an object may be determined by testing the reference itself rather than loading a bit or field from the referenced object or by checking address ranges. Further, embodiments do not rely on address ranges to identify objects as thread-local, and so the allocation of thread-local objects may not be restricted to thread-local heaps.

30 Claims, 4 Drawing Sheets

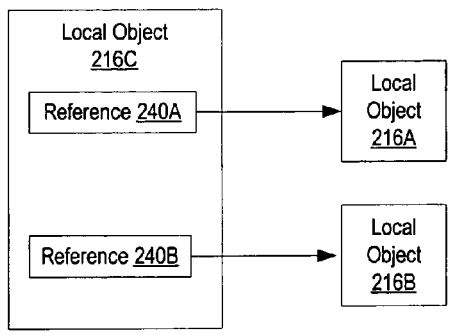 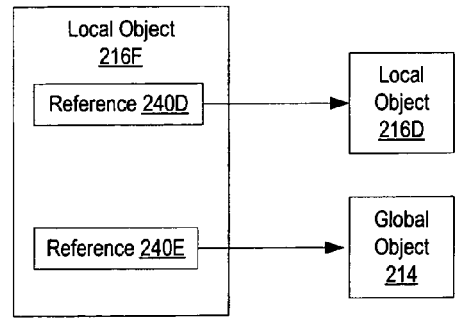
FIG. 3　　　　　　　　　　FIG. 4
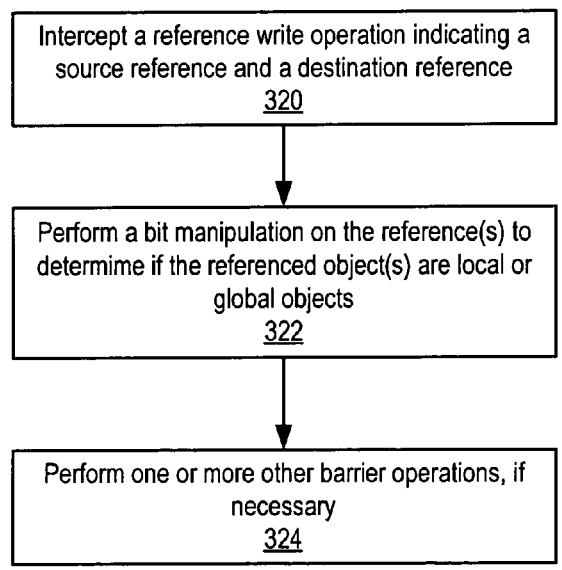
FIG. 5

TAGGED REFERENCES FOR THREAD-LOCAL DATA

BACKGROUND OF THE INVENTION

1. Field of the Invention

This invention relates to computer systems, and more particularly to the management of thread-local data.

2. Description of the Related Art

Objects

In some systems, which are usually known as "object oriented," objects may have associated methods, which are routines that can be invoked by reference to the object. Objects may belong to a class, which is an organizational entity that may contain method code or other information shared by all objects belonging to that class. However, the term "object" may not be limited to such structures, but may additionally include structures with which methods and classes are not associated. More generally, the term object may be used to refer to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, sixteen, thirty-two, or sixty-four bits of information, although there are other ways to represent a reference.

Threads

Computer systems typically provide for various types of concurrent operation. A user of a typical desktop computer, for instance, may be simultaneously employing a word-processor program and an e-mail program together with a calculator program. A computer may one processor or several simultaneously operating processors, each of which may be operating on a different program. For computers with a single main processor, operating-system software typically causes that processor to switch from one program to another rapidly enough that the user cannot usually tell that the different programs are not really executing simultaneously. The different running programs are usually referred to as "processes" in this connection, and the change from one process to another is said to involve a "context switch." In a context switch one process is interrupted, and the contents of the program counter, call stacks, and various registers are stored, including those used for memory mapping. Then the corresponding values previously stored for a previously interrupted process are loaded, and execution resumes for that process. Processor hardware and operating system software typically have special provisions for performing such context switches.

A program running as a computer system process may take advantage of such provisions to provide separate, concurrent "threads" of its own execution. Switching threads is similar to switching processes: the current contents of the program counter and various register contents for one thread are stored and replaced with values previously stored for a different thread. But a thread change does not involve changing the memory mapping values, as a process change does, so the new thread of execution may have access to the same process-specific physical memory as the same process's previous thread.

In some cases, the use of multiple execution threads is merely a matter of programming convenience. For example, compilers for various programming languages, such as the Java™ programming language, readily provide the "housekeeping" for spawning different threads, so the programmer is not burdened with all the details of making different threads' execution appear simultaneous. (Java is a trademark or registered trademark of Sun Microsystems, Inc., in the United States and other countries.) In the case of multiprocessor systems, the use of multiple threads may provide speed advantages. A process may be performed more quickly if the system allocates different threads to different processors when processor capacity is available. To take advantage of this fact, programmers may identify constituent operations within their programs that particularly lend themselves to parallel execution. When a program reaches a point in its execution at which the parallel-execution operation can begin, the program may start different execution threads to perform different tasks within that operation.

Thread-Local Heaps

Some conventional memory management schemes for multithreaded applications may partition memory space (e.g., a heap, such as a Java™ heap) used by a process into thread-local heaps (with one thread-local heap for each thread) and a global, or shared, heap. One approach to thread-local heaps is described in a paper by Domani et al. in the Proceedings of the 2002 International Workshops on Memory Management (ISMM) entitled "Thread-Local Heaps For Java."

FIG. 1 illustrates an exemplary application with multiple threads in which the heap has been segmented into thread-local heaps and a global memory area. In FIG. 1, application 100 may implement one or more threads 120. Heap 110 may be partitioned to provide a thread-local heap 112 for each thread and a global heap. Thread-local objects 116 may be allocated in the thread-local heaps 112. Global objects 114 may be allocated in the global heap partition. Note that a local object 116 may be pure (i.e., may only reference other local objects 116) or may be impure (i.e., may reference either local objects or global objects).

Among other advantages, partitioning the heap 110 as illustrated in FIG. 1 and allowing threads 120 to allocate thread-local data in thread-specific heaps, thread-local data may be garbage collected on a per-thread basis, reducing the need for global garbage collection across all threads 120. Another advantage of partitioning the heap 110 as illustrated in FIG. 1 is that this memory management technique may reduce or eliminate the need for synchronization among threads 120, for example when the threads access thread-local data, and may generally allow for a "weaker" memory mode.

In memory management schemes for multithreaded processes that partition memory (e.g., a heap) to provide thread-local heaps, a mechanism may be implemented to identify thread-local data, more specifically to distinguish thread-local objects 116 from global objects 114. Conventional memory management schemes may use static or dynamic techniques to identify thread-local objects. The paper by Domani, et al. referenced above presents a dynamic technique for identifying thread-local objects, and also reviews conventional static techniques. These conventional techniques for identifying thread-local objects generally either rely on the fact that the address space (e.g., the heap) is partitioned and only allocate thread-local objects in particular partitions of the address space and therefore use some form of address range check to determine whether an object is thread-local or global, or alternatively use a bit or field in the data structure of the object itself that may be checked to determine if the object is thread-local or global. For example, in the dynamic technique presented by Domani, et al., a bit is set in each local object that may be checked in a write-barrier.

Conventional techniques for identifying thread-local objects that rely on some sort of address-range check to identify objects as thread-local or global necessarily limit the allocation of thread-local objects to the thread-local heaps. Conventional techniques for identifying thread-local objects that rely on a bit or field within the object itself to identify objects as thread-local or global require a load of an object and a check of the bit or field to determine whether the object in question is thread-local or global.

SUMMARY

Embodiments of a method and apparatus for tagged references for identifying thread-local data in multithreaded applications are described. Embodiments may provide a dynamic mechanism that identifies thread-local objects by "tagging" references to the objects. Embodiments of the tagged reference mechanism for thread-local data may provide inexpensive read- and write-barriers for use when accessing such objects, and may also provide other relatively simple operations on references, when compared to conventional mechanisms for implementing and identifying thread-local data.

In embodiments, at each allocation site in an application's code, a decision is made as to whether to allocate an object as being a shared (global) object or as being a thread-local object. If the object is to be allocated as a thread-local object, one or more bits of the object reference may be "tagged" or set to some value to indicate that the object is a thread-local object, and returned to the caller. In one embodiment, the lowest-order bit of the object reference is set to indicate that the object is a thread-local object.

Embodiments of the tagged reference mechanism for thread-local data may allow less expensive read- and write-barrier checks for thread locality than conventional mechanisms for identifying thread-local data. In embodiments, thread locality of an object may be determined by testing the reference itself rather than loading a bit or field from the referenced object or by checking address ranges, as is necessary in some conventional mechanisms.

Further, embodiments of the tagged reference mechanism for thread-local data do not rely on address ranges to identify objects as thread-local or global, and so in at least one embodiment, the allocation of thread-local objects may not be restricted to the thread-local heaps. By tagging the references to objects to identify the objects as thread-local (or global) objects as described herein, a thread-local object may be allocated anywhere in memory and still be identified as a thread-local object. Thus, in some embodiments, the heap may not necessarily be partitioned into thread-local heaps and global heaps.

BRIEF DESCRIPTION OF THE DRAWINGS

FIG. 3 illustrates an exemplary "pure" object according to one embodiment.

FIG. 4 illustrates an exemplary "impure" object according to one embodiment.

FIG. 5 is a flowchart of a method for implementing a barrier mechanism according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for tagged references for identifying thread-local data in multithreaded applications are described. Embodiments may provide a dynamic mechanism that identifies thread-local objects by "tagging" references to the objects. Embodiments of the tagged reference mechanism for thread-local data may provide inexpensive read- and write-barriers for use when accessing such objects, and may also provide other relatively simple operations on references, when compared to conventional mechanisms for implementing and identifying thread-local data.

In embodiments, at each allocation site in an application's code, a decision is made as to whether to allocate an object as being a shared (global) object or as being a thread-local object. If the object is to be allocated as a thread-local object, one or more bits of the object reference may be "tagged" or set to some value to indicate that the object is a thread-local object, and returned to the caller. In one embodiment, the lowest-order bit of the object reference is set to indicate that the object is a thread-local object.

Figure 2:
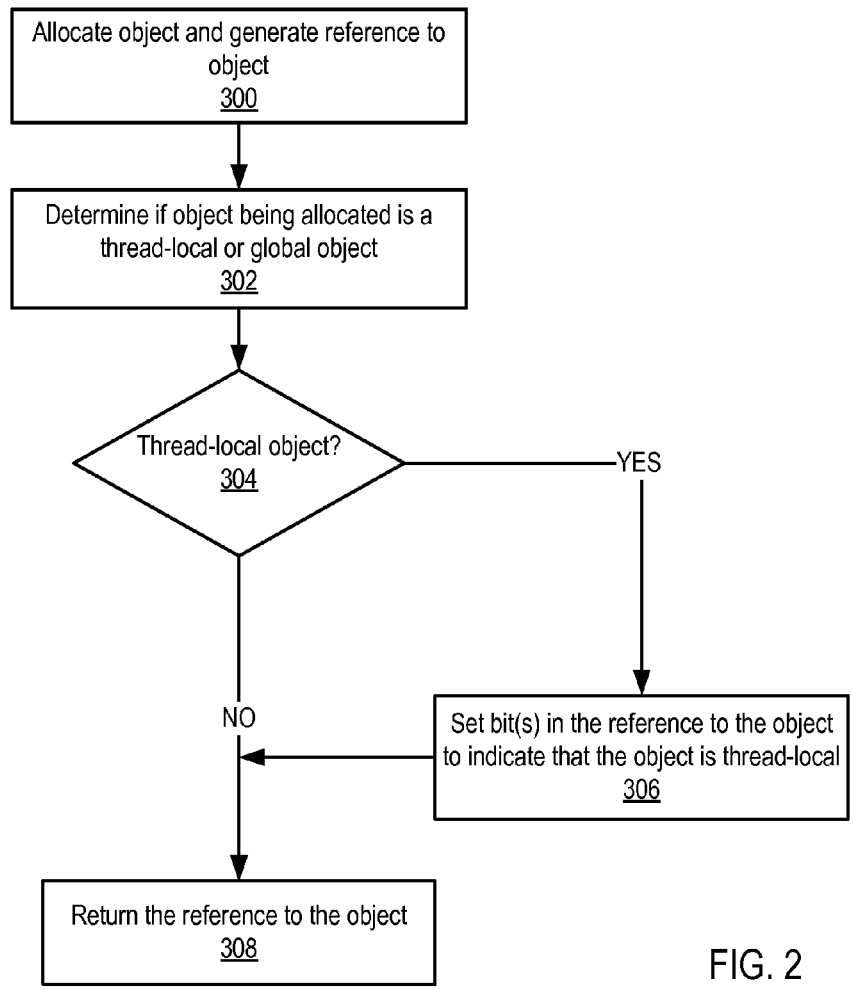
FIG. 2 is a flowchart of a method for tagging references to objects to indicate that the objects are thread-local on an allocation operation according to one embodiment.

FIG. 2 is a flowchart of a method for tagging references to objects to indicate that the objects are thread-local on an allocation operation according to one embodiment. At some point in the application code, an allocation mechanism may be called to allocate a new object, for example in the application heap. The allocation mechanism may allocate the object and generate a reference (memory address) to the object, as indicated at 300. The allocation mechanism may then determine if the allocated is a thread-local or global object, as indicated at 302. At 304, if the object is determined to be a thread-local object, then the allocation mechanism may set bit(s) in the reference to the object to indicate that the object is thread-local, as indicated at 306. Note that, in one embodiment, the lowest-order bit of the object reference is set to indicate that the object is a thread-local object. Also note that, if the object is global and not thread-local, then the bit(s) are not set. The reference to the object may then be returned by the allocation mechanism, as indicated at 308.

Note that memory management schemes typically align memory on some boundary (e.g., 16-bit, 32-bit, or some other boundary) so the lowest-order bit is typically not used (i.e., is typically "0"). Thus, the lowest-order bit of memory addresses (and thus references) used in an application are typically not used for other purposes, and thus may be used to tag references to thread-local objects as described herein. Note that the same bits in references to global objects are not set, or alternatively are set to some other value, and thus references to thread-local objects may be distinguished from references to global objects using relatively simple and inexpensive mechanisms (e.g., bit operations).

As an example, the following is an exemplary 16-bit memory address (illustrated in binary), and is illustrative of a typical memory address that may be used as an object reference in an application. Note that this example is exemplary and is not intended to be limiting; a similar example for 32-bit, 64-bit, or other memory addresses could be provided. The untagged memory address may appear as:

High → Low 0 x 1011100110110000

Note that the lowest-order bit is not used (is "0"), which will be true for all memory addresses used as references to objects in an application using a memory management scheme that aligns memory on a boundary greater than can be addressed using the lowest-order bit.

In one embodiment, if the object is allocated as a thread-local object, the lowest-order bit of the above exemplary address may be set to 1 to indicate that the object is a thread-local, and not a global, object (a value of 0 in the lowest-order bit of the address may therefore indicate that the object is a global object). The tagged memory address may then appear as:

High → Low 0 x 1011100110110001

Note that, in another embodiment, the lowest-order bit may be set to 1 to indicate that the object is a global object, and 0 to indicate that the object is a thread-local object. Also note that other embodiments may set two or more low-order bits of the address to some value to indicate that the object is a thread-local object, and to a different value to indicate that the object is a global object. Further, other embodiments may use other techniques to tag the references to objects to identify the objects as thread-local or global.

One embodiment of the tagged reference mechanism for thread-local data may enforce a discipline or rule in which all thread-local objects are pure (i.e., the thread-local objects may include references to only other thread-local objects). One embodiment may allow thread-local objects to be impure (i.e., the thread-local objects may include references to either thread-local or global objects).

FIG. 3 illustrates an exemplary "pure" object according to one embodiment. Local object 216C includes two references 240A and 240B, which may be stored in reference fields of the local object. Reference 240A refers to another local object 216A, while reference 240B refers to another local object 216B. Note that local object 216 does not include any references to global objects. Also note that one or more bits (in one embodiment, the lowest-order bit) of references 240A and 240B may be set to indicate that the references are to thread-local objects.

FIG. 4 illustrates an exemplary "impure" object according to one embodiment.

Local object 216F includes two references 240D and 240E, which may be stored in reference fields of the local object. Reference 240D refers to another local object 216D, while reference 240E refers to a global object 214. Note that one or more bits (in one embodiment, the lowest-order bit) of reference 240D may be set to indicate that the reference is to a thread-local object, while the corresponding bit(s) of reference 240E indicate that the reference is to a global object.

In one embodiment, in the application, accesses that read from and/or otherwise use a tagged reference to a thread-local object as a memory address may be configured to clear the lowest-order bit (which is used to indicate that the object is thread-local or global) before so using the reference. This may be necessary, for example, to ensure that other software code and/or hardware that may access memory using the references receives a "correct" memory address. Note that some low-level code and/or system hardware may not be aware that the lowest-order bit is being used as described herein, and that a set low-order bit may potentially generate a trap or error condition on an attempt to access a memory location. For such code or hardware, the check that the writing of a reference is allowing a thread-local object to escape may be performed by this trap-generating mechanism and without explicit checks. For other systems, the check may be performed explicitly in the code with a comparison and branch to handle those cases where a thread-local object escapes.

Embodiments may provide one or more "barriers" that may be used around reference write operations. Such a barrier may be used, for example, when there is a reference to an object (a source object) that may be written to a field in another object (a destination object). Since, in embodiments, the references to the objects are used to indicate whether the object(s) are local or global objects, the barriers may use relatively simple and fast bit operations on the references to determine whether the source and/or destination objects are thread-local or global objects. Note that, as described herein, whether the source and destination objects are thread-local or global may generate extra work. For example, writing a reference to a "source" thread-local object into a "target" global object effectively publishes the thread-local objects and any other thread-local objects referenced from that object, which may require the references to the object(s) to be updated.

FIG. 5 is a flowchart of a method for implementing a barrier mechanism according to one embodiment. As indicated at 320, the barrier mechanism may intercept a reference write operation indicating a source reference and a destination reference. As indicated at 322, the barrier mechanism may perform a bit operation on the reference(s) to determine if the referenced object(s) are local or global objects. Exemplary bit operation operations are further described below. As indicated at 324, the barrier mechanism may then perform one or more other barrier operations, if necessary, based upon whether the referenced source and/or target objects are determined to be local or global.

Note that the write of a reference to a thread-local object into another object may potentially publish the reference to an object that is global, effectively making the thread-local object a global object. In one embodiment, the barrier(s) may ensure that, if a thread-local object is so published in a global object, all of the states (references) for all of the objects reachable from the published local object are updated, if necessary, to indicate that the objects are now global objects.

Since, in embodiments, write barrier operations may be performed on the references themselves, the operations are inexpensive when compared to conventional barrier mechanisms that require the loading of data from the object itself. In embodiments, write barrier operations may be performed using bit operations or comparisons on the target and source addresses (references) of the objects, and do not require the load of a bit or field from the object itself, as do conventional mechanisms. Note that the source is the reference to the object that may or may not be local and for which the barrier determines whether or not the object is being published by being referenced from the object to which the source reference is being written, and the target is the (reference to the) object to which the source reference is to be written. In embodiments, a comparison of these two references (addresses) may be performed without having to load data from either object, thus providing a faster barrier than conventional mechanisms.

By allowing bit operations and comparisons to be performed directly on references rather than requiring the loading of data from the objects themselves, embodiments may provide similar performance advantages over conventional mechanisms in other operations. For example, using bit(s) in references to objects to indicate that the objects are thread-local or global may provide performance advantages over conventional mechanisms in doing checks to see whether thread synchronization operations, which do not have to be performed on thread-local objects, are necessary.

In one embodiment, accesses that write a reference to an object into another object may be configured to first check the reference (e.g., by examining the bit(s) used to tag references) to ensure that the write would not allow a thread-local object to escape (become global). Note that this would happen, for example, if a reference to a thread-local object were written into a global object. Since the thread-local object would then be referenced from a global object, the object would effectively no longer be considered thread-local. Thus, the thread-local object may be considered to have "escaped" and become global by being referenced from a global object.

Figure 6:
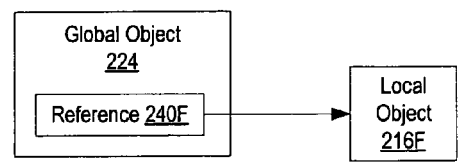
FIG. 6 illustrates an exemplary global object that includes a reference to a thread-local object according to one embodiment.

FIG. 6 illustrates an exemplary global object that includes a reference to a thread-local object according to one embodiment. In this example, global object 214 includes a reference 240F that refers to a local object 216F. Since local object 216F is now referred to from a global object 214, local object 216F may be considered to have "escaped". Note that one or more bits (in one embodiment, the lowest-order bit) of reference 240F may be set to indicate that the reference is to a now-global object.

Some embodiments may explicitly check the bits of addresses of the (reference to) the object being written and the (reference to) the object whose reference field is being modified. Other embodiments may rely upon hardware support for detecting the misalignment of addresses. To generate a fault on a trap when a thread-local object escapes, embodiments may perform one of the following address operations, or a similar operation, on an attempt to write a reference to one object into another object. For these examples, assume p is an object, r is a reference to another object, p.f is a reference field in the object p to which the reference r is to be written, and t is a temporary value or register. Also, note that in this example, the lowest-order bit of a reference, if set (i.e., if "1"), indicates that the reference is to a thread-local object. Also note that, for these examples, for simplicity, a 16-bit memory address is assumed, though note that this is exemplary and that these calculations other sizes of memory addresses.

For pure thread-local objects, in one embodiment, the following address calculation may be used. Note that the carat (^) is indicative of an XOR operation, and that (&) is indicative of an AND operation:

t:=((r & 0x0000000000000001) ^ p);
t.f:=r;

For impure thread-local objects, in one embodiment, the following address calculation may be used. Note that the bar (|) is indicative of an OR operation, and that (&) is indicative of an AND operation:

t:=((r & 0x0000000000000001)||p)–(p & 0x0000000000000001);
t.f:=r;

In each of the above cases, the low-order bit of the temporary value or register, t, will be 1 if and only if a thread attempts to write a reference to a thread-local object into a global object, or in the case of pure thread-local objects a thread attempts to write a reference to a global object into a thread-local object. In such cases, the low-order bit may be explicitly tested with a sequence of instructions, and in the event that the test indicates a write that will cause a thread-local object to escape, redirects the thread to a routine to handle the realignment of the references to the escaping objects. Alternatively, the low-order bit may implicitly be tested by the hardware resulting in the generation of an address-misalignment trap, and the trap handler for this trap may then handle the realignment of the references to the escaping object(s).

Embodiments of the tagged reference mechanism for thread-local data may allow less expensive read- and write-barrier checks for thread locality than conventional mechanisms for identifying thread-local data. In embodiments, thread locality of an object may be determined by testing the reference itself rather than loading a bit or field from the referenced object or by checking address ranges, as is done in conventional mechanisms. As previously noted, some conventional mechanisms may rely on a bit or field within the object itself to identify objects as thread-local or global, and the read- and write-barriers thus involve loads and checks rather than simple bit-manipulation of the references.

Figure 1:
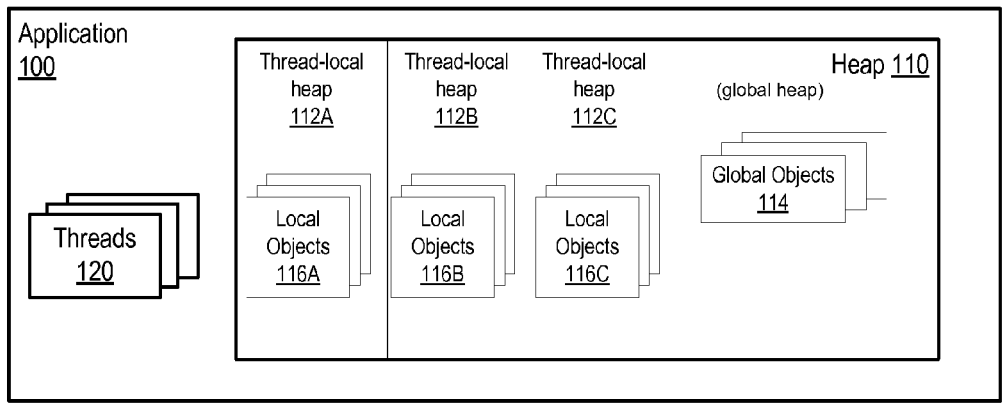
FIG. 1 illustrates an exemplary application with multiple threads in which the heap has been segmented into thread-local heaps and a global memory area.

Further, some conventional mechanisms may rely on some sort of address-range check to identify objects as thread-local or global, and thus necessarily limit the allocation of thread-local objects to the thread-local heaps. Embodiments of the tagged reference mechanism for thread-local data, however, do not rely on address ranges to identify objects as thread-local or global, and so in at least one embodiment, the allocation of thread-local objects may not be restricted to the thread-local heaps. By tagging the references to objects to identify the objects as thread-local (or global) objects as described herein, a thread-local object may be allocated anywhere in memory and still be identified as a thread-local object. Thus, in some embodiments, the heap may not necessarily be partitioned into thread-local heaps and global heaps, as was illustrated in FIG. 1.

Figure 7:
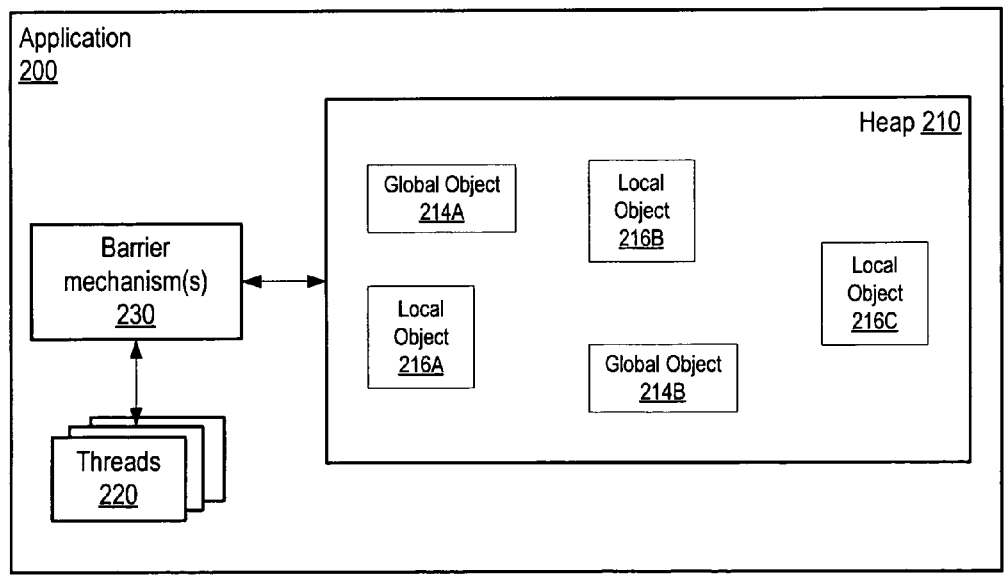
FIG. 7 illustrates an exemplary application with multiple threads in which various thread-local objects and global objects have been allocated in a heap that does not partition memory into thread-local and global regions according to one embodiment.

FIG. 7 illustrates an exemplary application with multiple threads in which various thread-local objects and global objects have been allocated in a heap that does not partition memory into thread-local and global regions according to one embodiment. In FIG. 7, application 200 may implement one or more threads 220. Thread-local objects 216 may be allocated in the heap 210. Global objects 214 may also be allocated in the heap 210. Note that a local object 216 may be pure (i.e., may only reference other local objects 216) or may be impure (i.e., may reference either local objects or global objects). Application 200 may also implement one or more barrier mechanisms 230 that may perform operations on references to objects on reads and writes to the objects allocated in heap 200 as described herein, and that these operations do not require a load of the objects or a bit or field of the objects, as do some conventional mechanisms.

Embodiments of the tagged reference mechanism for thread-local data as described herein may be especially efficient on architectures such as Sun SPARC architectures that allow for the fast handling of misalignment traps. In some embodiments, the cost of various operations on references, for example of clearing bits in references, may be optimized by a compiler employing the elimination of common sub expressions, and the tracking of dominating stores.

Figure 8:
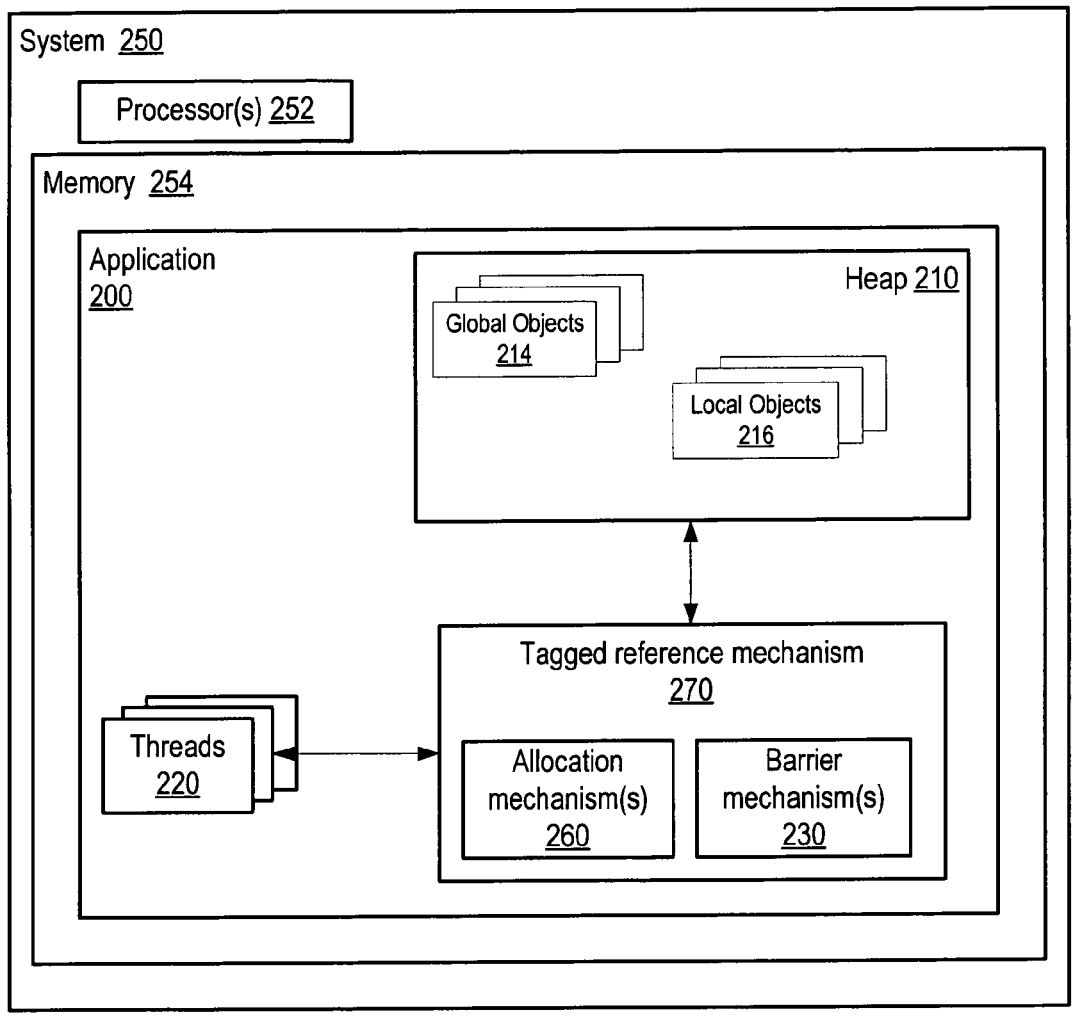
FIG. 8 illustrates a system implementing a tagged reference mechanism for thread-local data according to one embodiment.

FIG. 8 illustrates a system implementing a tagged reference mechanism for thread-local data according to one embodiment. System 250 may be any of various types of devices, including, but not limited to, a personal computer system, desktop computer, laptop or notebook computer, server computer, mainframe computer system, workstation, network computer, Portable Digital Assistant (PDA), smartphone, or other suitable device. System 250 may include at least one processor 252. The processor 252 may be coupled to a memory 254. Memory 254 is representative of various types of possible memory media, also referred to as "computer readable media" or "computer-accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

System 250 may include, in memory 254, an instance of an application 200 that implements a tagged reference mechanism 270 for thread-local data as described herein. Application 200 may implement one or more threads 220. Thread-local objects 216 may be allocated in the heap 210. Global objects 214 may also be allocated in the heap 210. For thread-local objects, any references to the thread-local objects may have one or more bits set to indicate that the objects are thread-local, and not global, objects, as described herein. In one embodiment, the lowest-order bit of an object's reference may be set to indicate that the object is a thread-local object 216. Note that a local object 216 may be pure (i.e., may only reference other local objects 216) or may be impure (i.e., may reference either local objects 216 or global objects 214).

Tagged reference mechanism 270 may include one or more allocation mechanisms 260 configured to tag references to thread-local objects 216 as described herein. Tagged reference mechanism 270 may also include one or more barrier mechanisms 230 or other mechanisms that may, for example perform operations on references to objects on reads and writes to the objects allocated in heap 200 as described herein. Note that these operations do not require a load of the objects or a bit or field of the objects, as do some conventional mechanisms. Also note that, in one embodiment, the thread-local objects 216 may not be restricted to thread-local partitions in heap 210.

While tagged reference mechanism 270 is illustrated as part of application 200 in FIG. 8, note that one or more of the functionalities of tagged reference mechanism 270 as described herein may, in various embodiments, be provided by the underlying operating system software and/or memory management software, by the programming language in which the application 200 was written and compiled, or by a combination of one or more of the above. For example, a programming language may provide an API to one or more memory allocation mechanisms and/or barrier mechanisms as part of a library that supports tagged references for thread-local data as described herein. A programmer may then use this API when developing a multithreaded application to include the functionality of the tagged reference mechanism 270 in the application. Also note that, in one embodiment, system (e.g., processor) and/or memory hardware may be implemented to support one or more aspects of the tagged reference mechanism 270 as described herein.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for identifying thread-local objects in a multithreaded application, comprising:
   allocating an object in application memory for a thread in response to an allocation request from the thread;
   determining if the object is a thread-local object or a global object shareable by two or more threads of the application;
   in response to determining that the object is a thread-local object, tagging a reference to the object, said tagging comprising setting one or more low-order bits in the reference to a value indicating that the object is a thread-local object,
      wherein the reference is stored separately from the object and comprises data indicating a memory location where the object is stored, wherein the reference is usable to access the object; and
   in response to the allocation request, returning the tagged reference, but not the object itself, to the thread;
      wherein the tagged reference is usable by the thread to determine that the object is thread-local without examining the object itself.

2. The method as recited in claim 1, further comprising:
   repeating said allocating and said determining in response to another allocation request; and
   in response to determining that the object is a global object, setting the one or more low-order bits in the reference to the object to a different value to indicate that the object is a global object.

3. The method as recited in claim 1, wherein said setting one or more low-order bits in a reference to the object to a value to indicate that the object is a thread-local object comprises setting a lowest-order bit of the reference to a value of 1 to indicate that the object is a thread-local object, and wherein a value of 0 in the lowest-order bit indicates that the object is a global object.

4. The method as recited in claim 1, wherein the application memory comprises an application heap, and wherein the object is allocated in the application heap.

5. The method as recited in claim 1, wherein the application heap is not partitioned into thread-local heaps and a global heap, and wherein thread-local objects and global objects are allocated in any location in the application heap.

6. The method as recited in claim 1, further comprising, on an operation in the application involving the reference to the object, directly testing the reference to the object to determine if the object is a thread-local object or a global object, wherein said testing does not require data from the object to be loaded or a test of address ranges in the application memory.

7. The method as recited in claim 6, wherein said directly testing the reference to the object comprises performing one or more bit operations on the reference.

8. The method as recited in claim 1, further comprising, on a write operation of the reference to the object to a target object:
a write barrier in the application receiving the reference to the object as a source object and a reference to the target object; and
the write barrier directly testing the reference to the source object and the reference to the target object to determine if the objects are global objects or thread-local objects, wherein said testing does not require data from the objects to be loaded or a test of address ranges in the application memory.

9. The method as recited in claim 8, wherein said directly testing the reference to the source object and the reference to the target object comprises performing one or more bit operations on the references.

10. The method as recited in claim 8, further comprising, if the source object is a thread-local object and the target object is a global object, the write barrier updating the source object and any other objects referenced by the source object to indicate that the objects are global objects.

11. A system, comprising:
a processor; and
a memory comprising program instructions, wherein the program instructions are executable by the processor to implement a multithreaded application comprising a tagged reference mechanism for thread-local data configured to:
allocate an object in application memory for a thread in response to an allocation request from the thread;
determine if the object is a thread-local object or a global object shareable by two or more threads of the application;
if the object is a thread-local object, tag a reference to the object, said tagging comprising setting one or more low-order bits in the reference to a value indicating that the object is a thread-local object,
wherein the reference is stored separately from the object and comprises data indicating a memory location where the object is stored, wherein the reference is usable to access the object; and
in response to the allocation request, return the tagged reference to the object, but not the object itself, to the thread;
wherein the tagged reference is usable by the thread to determine that the object is thread-local without examining the object itself.

12. The system as recited in claim 11, wherein the tagged reference mechanism is further configured to, if the object is a global object, set the one or more low-order bits in the reference to the object to a different value to indicate that the object is a global object.

13. The system as recited in claim 11, wherein, to set one or more low-order bits in a reference to the object to a value to indicate that the object is a thread-local object, the tagged reference mechanism is further configured to set a lowest-order bit of the reference to a value of 1 to indicate that the object is a thread-local object, and wherein a value of 0 in the lowest-order bit indicates that the object is a global object.

14. The system as recited in claim 11, wherein the application memory comprises an application heap, and wherein, to allocate an object in application memory, the tagged reference mechanism is further configured to allocate the object in the application heap.

15. The system as recited in claim 11, wherein the application heap is not partitioned into thread-local heaps and a global heap, and wherein the tagged reference mechanism is further configured to allocate thread-local objects and global objects in any location in the application heap.

16. The system as recited in claim 11, wherein, on operations in the application involving the reference to the object, the tagged reference mechanism is further configured to directly test the reference to the object to determine if the object is a thread-local object or a global object, wherein said test does not require data from the object to be loaded or a test of address ranges in the application memory.

17. The system as recited in claim 16, wherein, to directly test the reference to the object, the tagged reference mechanism is further configured to perform one or more bit operations on the reference.

18. The system as recited in claim 11, wherein the tagged reference mechanism comprises a write barrier mechanism, wherein the write barrier mechanism is configured to, on a write operation of the reference to the object to a target object:
receive the reference to the object as a source object and a reference to the target object; and
directly test the reference to the source object and the reference to the target object to determine if the objects are global objects or thread-local objects, wherein said test does not require data from the objects to be loaded or a test of address ranges in the application memory.

19. The system as recited in claim 18, wherein, to directly test the reference to the source object and the reference to the target object, the write barrier is further configured to perform one or more bit operations on the references.

20. The system as recited in claim 18, wherein, if the source object is a thread-local object and the target object is a global object, the write barrier is further configured to update the source object and any other objects referenced by the source object to indicate that the objects are global objects.

21. A computer-accessible storage medium storing program instructions, wherein the program instructions, when executed on a computer, implement a tagged reference mechanism for thread-local data in a multithreaded application, wherein the tagged reference mechanism is configured to:
allocate an object in application memory for a thread in response to an allocation request from the thread;
determine if the object is a thread-local object or a global object shareable by two or more threads of the application;
if the object is a thread-local object, tag a reference to the object, said tagging comprising setting one or more low-order bits in the reference to a value indicating that the object is a thread-local object,
  wherein the reference is stored separately from the object and comprises data indicating a memory location where the object is stored, wherein the reference is usable to access the object; and
in response to the allocation request, return the tagged reference to the object, but not the object itself, to the thread;
  wherein the tagged reference is usable by the thread to determine that the object is thread-local without examining the object itself.

22. The computer-accessible storage medium as recited in claim 21, wherein the tagged reference mechanism is further configured to, if the object is a global object, set the one or more low-order bits in the reference to the object to a different value to indicate that the object is a global object.

23. The computer-accessible storage medium as recited in claim 21, wherein, to set one or more low-order bits in a reference to the object to a value to indicate that the object is a thread-local object, the tagged reference mechanism is further configured to set a lowest-order bit of the reference to a value of 1 to indicate that the object is a thread-local object, and wherein a value of 0 in the lowest-order bit indicates that the object is a global object.

24. The computer-accessible storage medium as recited in claim 21, wherein the application memory comprises an application heap, and wherein, to allocate an object in application memory, the tagged reference mechanism is further configured to allocate the object in the application heap.

25. The computer-accessible storage medium as recited in claim 21, wherein the application heap is not partitioned into thread-local heaps and a global heap, and wherein the tagged reference mechanism is further configured to allocate thread-local objects and global objects in any location in the application heap.

26. The computer-accessible storage medium as recited in claim 21, wherein, on operations in the application involving the reference to the object, the tagged reference mechanism is further configured to directly test the reference to the object to determine if the object is a thread-local object or a global object, wherein said test does not require data from the object to be loaded or a test of address ranges in the application memory.

27. The computer-accessible storage medium as recited in claim 26, wherein, to directly test the reference to the object, the tagged reference mechanism is further configured to perform one or more bit operations on the reference.

28. The computer-accessible storage medium as recited in claim 21, wherein the tagged reference mechanism comprises a write barrier mechanism, wherein the write barrier mechanism is configured to, on a write operation of the reference to the object to a target object:
  receive the reference to the object as a source object and a reference to the target object; and
  directly test the reference to the source object and the reference to the target object to determine if the objects are global objects or thread-local objects, wherein said test does not require data from the objects to be loaded or a test of address ranges in the application memory.

29. The computer-accessible storage medium as recited in claim 28, wherein, to directly test the reference to the source object and the reference to the target object, the write barrier is further configured to perform one or more bit operations on the references.

30. The computer-accessible storage medium as recited in claim 28, wherein, if the source object is a thread-local object and the target object is a global object, the write barrier is further configured to update the source object and any other objects referenced by the source object to indicate that the objects are global objects.

* * * * *